United States Patent
Zhang et al.

(10) Patent No.: US 11,275,720 B2
(45) Date of Patent: Mar. 15, 2022

(54) MULTI-PAGE SPLITTING OF A DATABASE INDEX

(71) Applicant: INTERNATIONAL BUSINESS MACHINES CORPORATION, Armonk, NY (US)

(72) Inventors: Ying Zhang, Beijing (CN); Xiaobo Wang, Beijing (CN); Shuo Li, Beijing (CN); Ping Wang, San Jose, CA (US); Leilei Li, San Jose, CA (US); Akiko Hoshikawa, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 16/775,715

(22) Filed: Jan. 29, 2020

(65) Prior Publication Data

US 2021/0232557 A1    Jul. 29, 2021

(51) Int. Cl.
  *G06F 7/00*    (2006.01)
  *G06F 16/22*   (2019.01)
  *G06F 16/28*   (2019.01)
  *G06F 16/11*   (2019.01)
  *G06F 16/18*   (2019.01)
  *G06F 16/17*   (2019.01)

(52) U.S. Cl.
  CPC ........ *G06F 16/2246* (2019.01); *G06F 16/119* (2019.01); *G06F 16/1734* (2019.01); *G06F 16/1865* (2019.01); *G06F 16/221* (2019.01); *G06F 16/282* (2019.01)

(58) Field of Classification Search
  CPC .. G06F 16/2246; G06F 16/221; G06F 16/282; G06F 16/1865; G06F 16/119; G06F 16/1734

USPC .......... 707/737, 769, 797, 999.008
See application file for complete search history.

(56) References Cited

U.S. PATENT DOCUMENTS 5,644,763 A    7/1997  Roy
8,176,023 B2   5/2012  Graefe
(Continued)

OTHER PUBLICATIONS

Campbell, John J.; DB2 for z/OS Best Practices Optimizing Insert Performance—Part 1; Transcript of webcast; May 2-6, 2011; 21 pages.
(Continued)

*Primary Examiner* — Md I Uddin
(74) *Attorney, Agent, or Firm* — Schmeiser, Olsen & Watts; Stephanie Carusillo

(57) ABSTRACT

An improved database-management system determines that a near-capacity leaf page of its database index must be split into multiple pages in order to store newly added index entries. The system determines whether the page should be "multi-split" into more than two pages, the total number of new pages to be added, and the range of indexed values assigned to each new page. These determinations are made as functions of the frequency with which the index page, and other index pages for the same index, have been split in the past, of the data distribution of values indexed by the leaf page, and of the degree of sequentiality of entries added to the leaf page. Leaf pages approaching capacity may also be scheduled for "pre-split" splitting during a period of lower utilization. These multi-split and pre-split operations reduce the numbers of index splits and of corresponding synchronous database-log writes.

17 Claims, 12 Drawing Sheets

(56) References Cited

U.S. PATENT DOCUMENTS

| | | | |
|---|---|---|---|
| 2008/0086470 A1* | 4/2008 | Graefe | G06F 16/2343 |
| 2012/0197900 A1* | 8/2012 | Mandre | G06F 16/2246 |
| | | | 707/743 |
| 2015/0220581 A1 | 8/2015 | Tronkov et al. | |
| 2018/0067974 A1 | 3/2018 | Fang et al. | |

OTHER PUBLICATIONS

Mell, Peter et al.; "The NIST Definition of Cloud Computing;" National Institute of Standards and Technology; Special Publication 800-145; Sep. 2011; 7 pages.

\* cited by examiner

MULTI-PAGE SPLITTING OF A DATABASE INDEX

BACKGROUND

The present invention relates in general to database management systems ("DBMSs") and in particular to the maintenance of database indexes.

A DBMS locates data items stored in a database 4002 by traversing a hierarchical index tree 430 to find a leaf node that contains the address of a desired data item. If the number of addresses stored in a single leaf node exceeds a maximum threshold value, the index page represented by that leaf node is split into two new nodes and the addresses it had stored must be divided among the new nodes.

Each time a DBMS must split an index leaf page, the DBMS must lock its logging mechanism in order to record the split. Other types of database updates do not necessarily require such a locking, but an index-splitting operations consists of multiple operations that must all be completed before users are again allowed to access a newly split index. The number of synchronous log writes required by index splits should therefore be minimized in order to ensure optimal DBMS performance.

SUMMARY

Embodiments of the present invention comprise systems, methods, and computer program products "multi-splitting" a leaf page of a database index into more than two new leaf pages. An improved index-management module of a database-management system determines that a near-capacity leaf page of its database index must be split into multiple pages in order to accommodate the continued addition of index entries. The system determines whether the page should be split in a conventional manner into two subpages, each of which is assigned one-half of the range of values assigned to the near-capacity leaf page, or multi-split into more than two pages. If multi-splitting, the system then determines the total number of new pages to be added and the range of indexed values assigned to each new page. These determinations are made as functions of the frequency with which the index page, and other index pages for the same index, have been split in the past, of the data distribution of stored database values indexed by the leaf page, and of the degree to which entries in the near-capacity leaf page have been added en masse by sequential INSERT operations. Leaf pages that contain fewer entries, but which are approaching a near-capacity condition may be registered and scheduled for a prophylactic "pre-split" splitting operation that may be performed during a period of lower utilization. Multi-split and pre-split operations improve database performance by reducing the total number of required index splits and by reducing the number of corresponding, distinct synchronous database-log writes.

DETAILED DESCRIPTION

Figure 1:
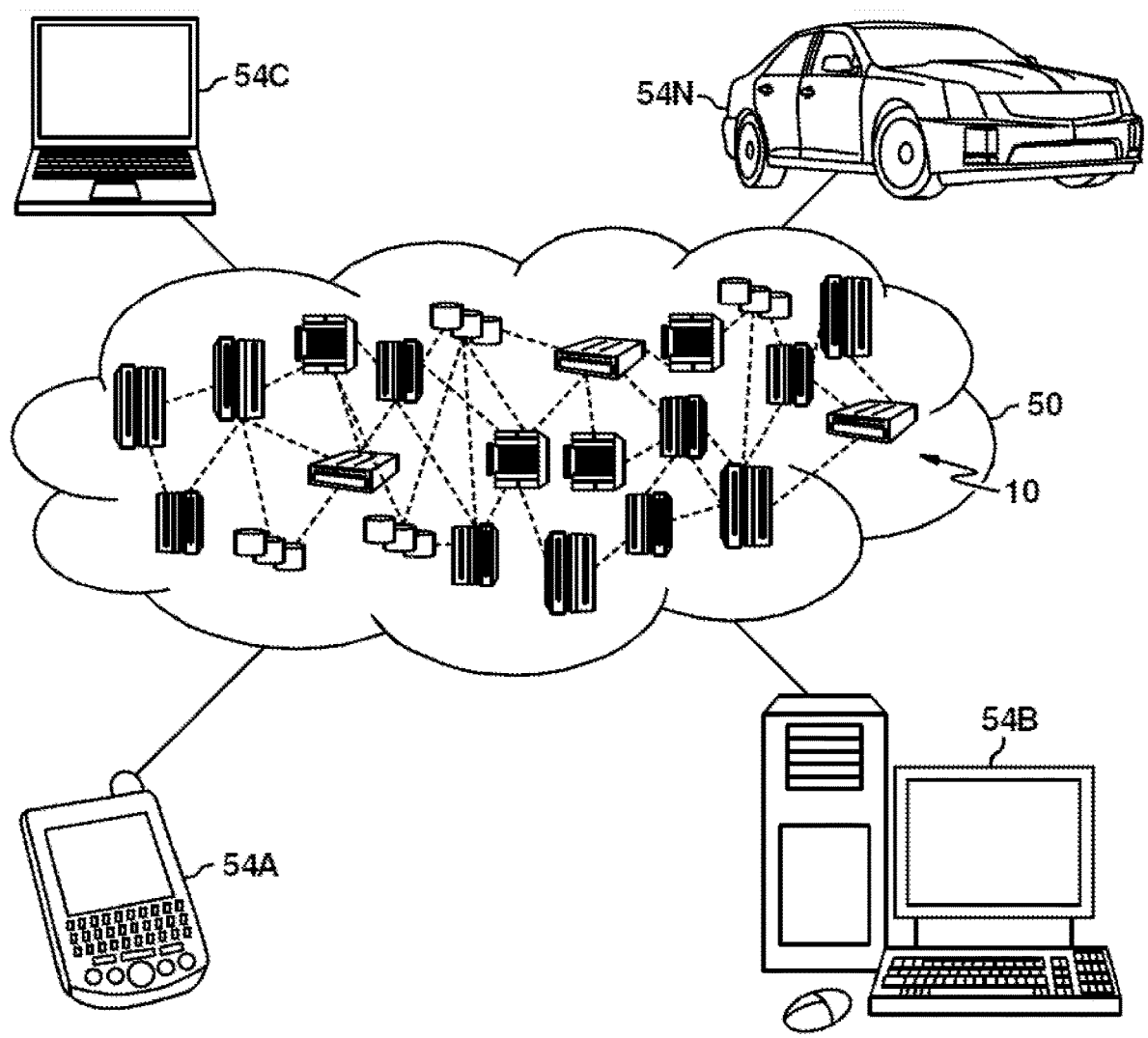
FIG. 1 depicts a cloud computing environment according to an embodiment of the present invention.

Pointers to the locations of data items stored in a database 4002 are stored in the leaf pages of a hierarchical index data structure 430. A database-management system (DBMS) 4001 locates each such stored data item by traversing the index tree to reach the leaf node that contains the address of a desired data item. Leaf nodes, however, have a fixed capacity, so if the number of entries in a single leaf node exceeds that node's maximum capacity, the leaf node must be split into two or more new nodes and the addresses it stores must be divided among the new nodes.

Each time a DBMS 4001 performs such an index-splitting operation, portions of the database 4002, including the database log 420, must be locked. DBMS performance can thus be significantly improved by reducing the number of required index-splitting operations and corresponding synchronous log-writing operations.

Known DBMS systems rely on unsophisticated index-splitting functionality that arbitrarily splits an index leaf node into two nodes. Each node stores pointers to indexed data items that have values within one-half of the value range covered by the original leaf node. Because data values need not be distributed uniformly, this simple splitting method can result in an uneven division of the values stored in the original leaf node. For example, if the original node stores pointers to instances of a numeric database column that spans the range 1000-2000, that node may contain 100 pointers to values in the 1000-1499 range and 10 pointers to values between 1500-2000 range. Evenly dividing the original node's range into a first new node associated with the range 1000-1499 and a second new node associated with the range 1500-2000 would thus result in a lopsided division of the entries stored in the original page. This can result in unnecessary or redundant splitting operations because adding even a relatively small number of entries to the newly added 1000-1499 leaf node may cause that node to exceed its fixed capacity.

Embodiments of the present invention address this problem by providing an improved DBMS 4001 that intelligently determines whether to split an index leaf node into more than two nodes and identifies an optimal range of values to assign to each newly created node. A second component of the present invention monitors the number of entries of leaf nodes each time a new entry is inserted into a leaf node and schedules "pre-split" splitting operations that perform preventive splits, potentially during a period of low utilization, upon leaf-page nodes that are likely to require a split in the near future.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
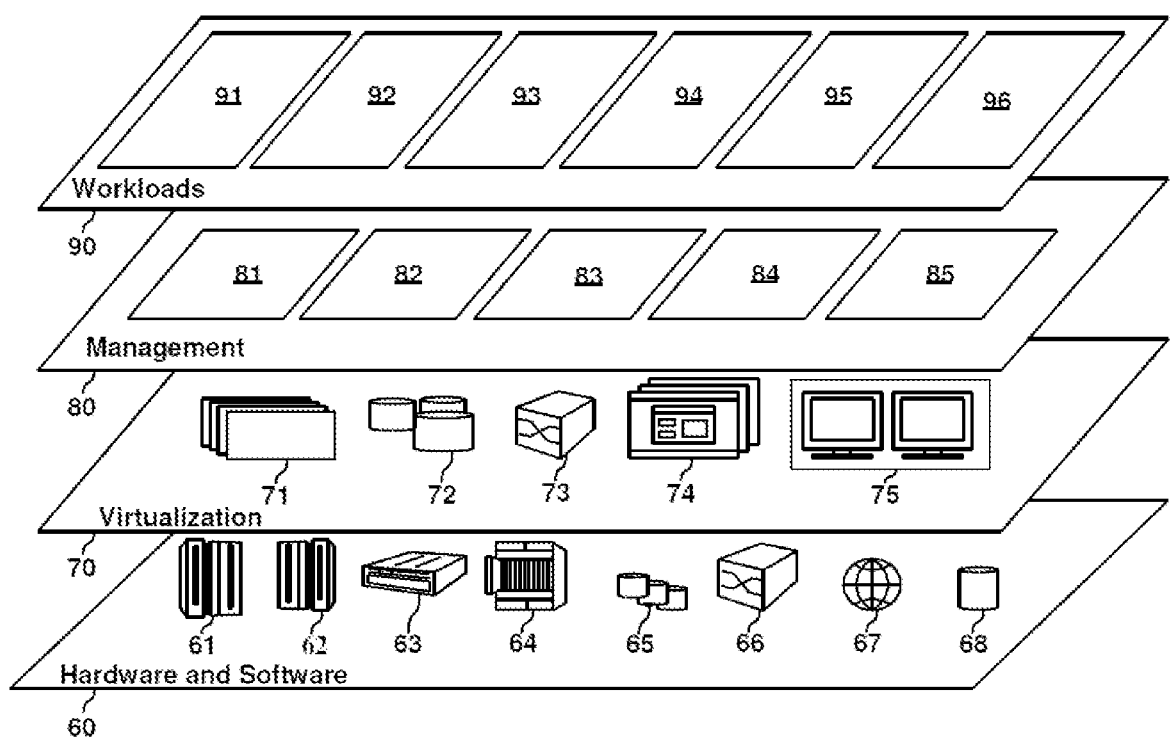
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of multipage splitting of a database index 96.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
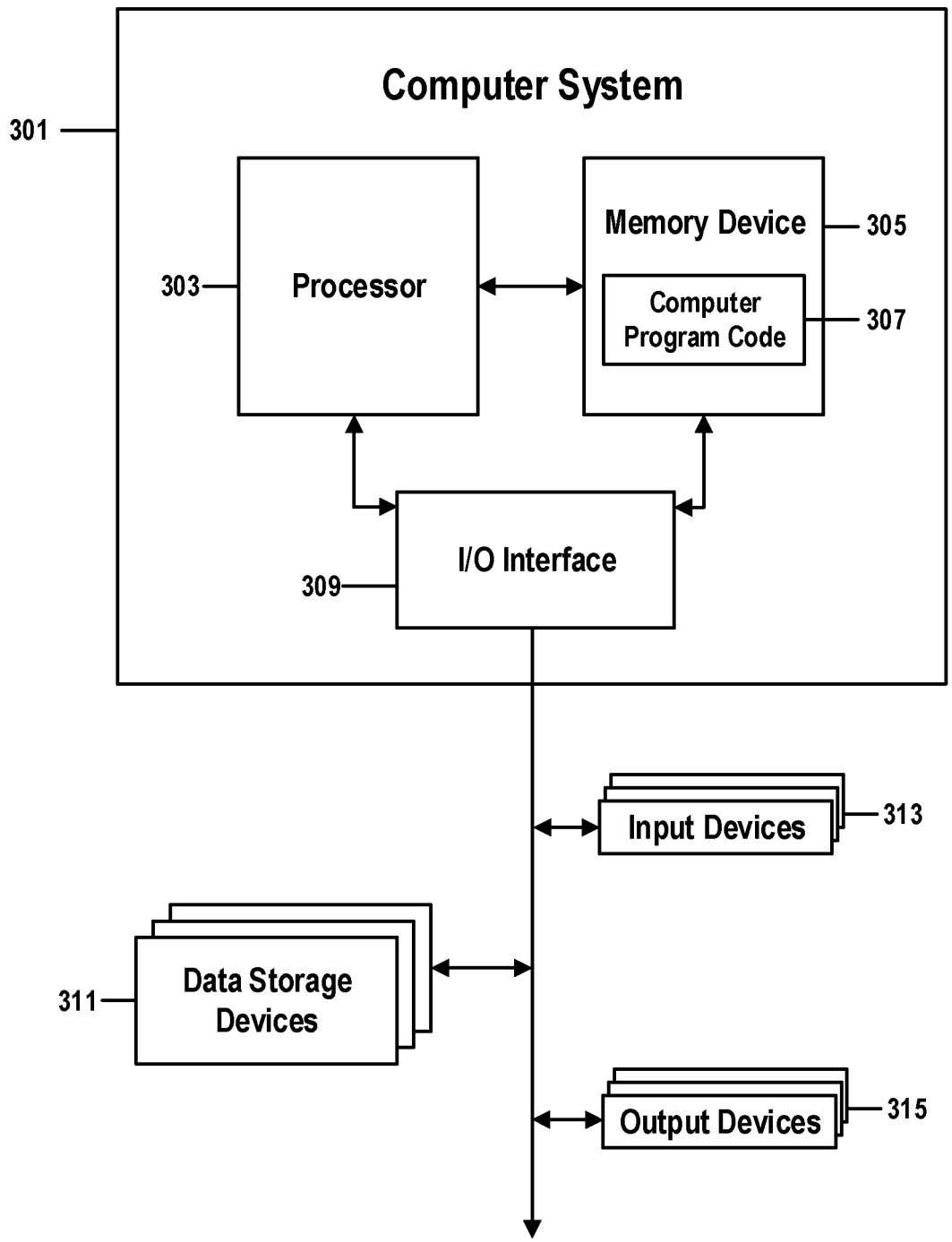
FIG. 3 shows the structure of a computer system and computer program code that may be used to implement a method for multi-page splitting of a database index in accordance with embodiments of the present invention.

FIG. 3 shows a structure of a computer system and computer program code that may be used to implement a method for multi-page splitting of a database index in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for multi-page splitting of a database index in accordance with embodiments of the present invention, and may implement other embodiments described in this specification, including the methods illustrated in FIGS. 1-12. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for multi-page splitting of a database index.

Any of the components of the present invention could be created, integrated, hosted, maintained, deployed, managed, serviced, supported, etc. by a service provider who offers to facilitate a method for multi-page splitting of a database index. Thus the present invention discloses a process for deploying or integrating computing infrastructure, comprising integrating computer-readable code into the computer system 301, wherein the code in combination with the computer system 301 is capable of performing a method for multi-page splitting of a database index.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for multi-page splitting of a database index may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for multi-page splitting of a database index is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
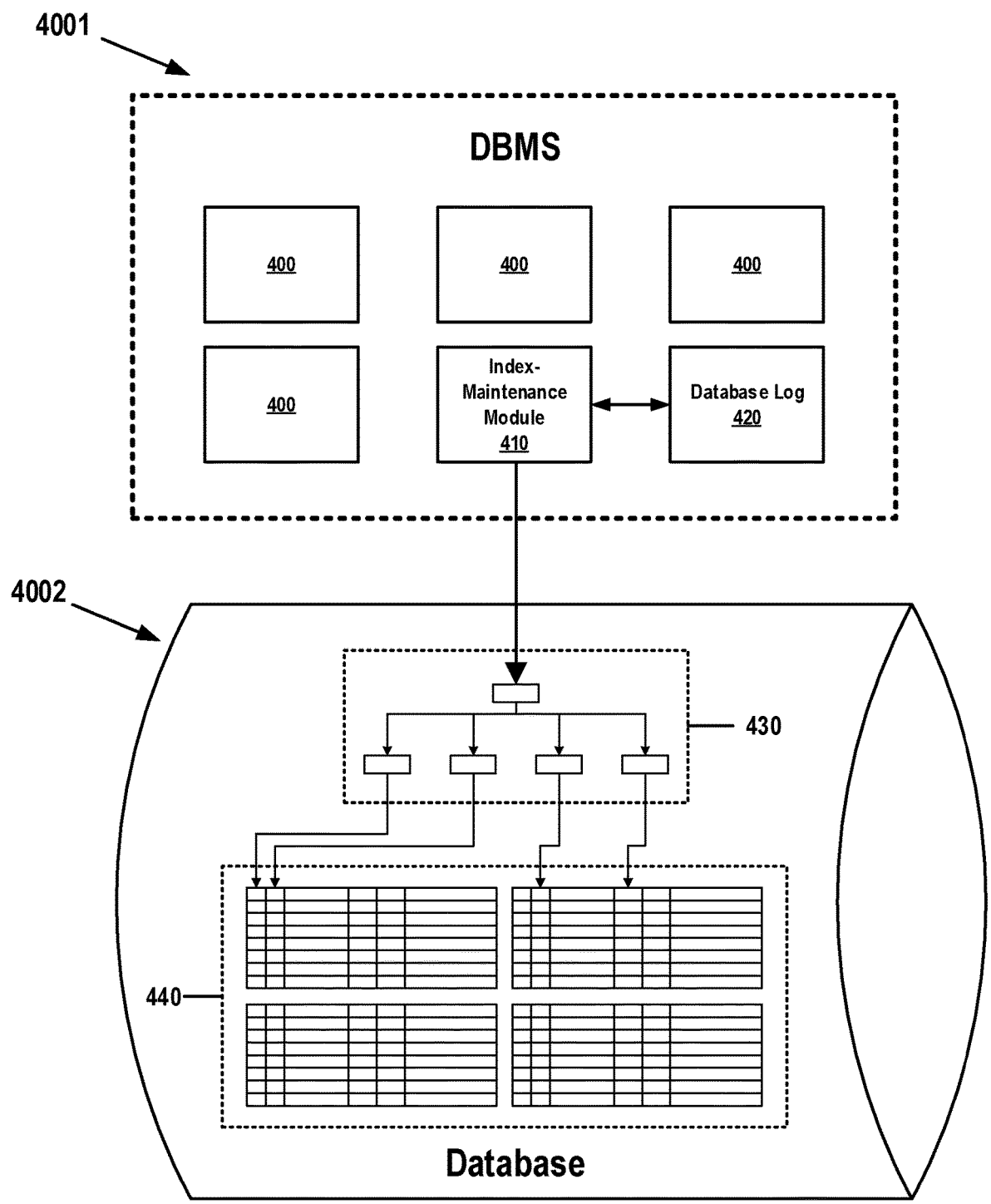
FIG. 4 shows elements of a high-level structure of a database management system, as is known in the art.

FIG. 4 shows elements of a high-level structure of a database management system (DBMS), as is known in the art. FIG. 4 shows items 4001-4002 and 400-440.

A DBMS 4001 manages data stored in a searchable repository of data known as a database 4002. A database 4002 that complies with the relational model of database structure stores data items as a set of tables 440. A table contains rows, each of which is a distinct instance of the set of data items that are stored in that table. The DBMS locates and accesses specific rows and stored data values by searching through indexes that point to individual data elements. The indexes are stored in a hierarchical tree-like structure 430. By traversing the tree from top to bottom, a DBMS 4001 may reach a leaf node of the tree that identifies the location of one or more specific data elements stored in the tables 440.

A DBMS 4001 that conforms with the relational model contains numerous modules 400. One such module 410 performs index-maintenance operations to ensure that the index tree 430 continues to function efficiently as values in the database tables 440 are continually updated. This mechanism is described in greater detail in subsequent figures. Another such module is database log 420, which records each transaction performed upon data items stored in database tables 440.

Figure 5:
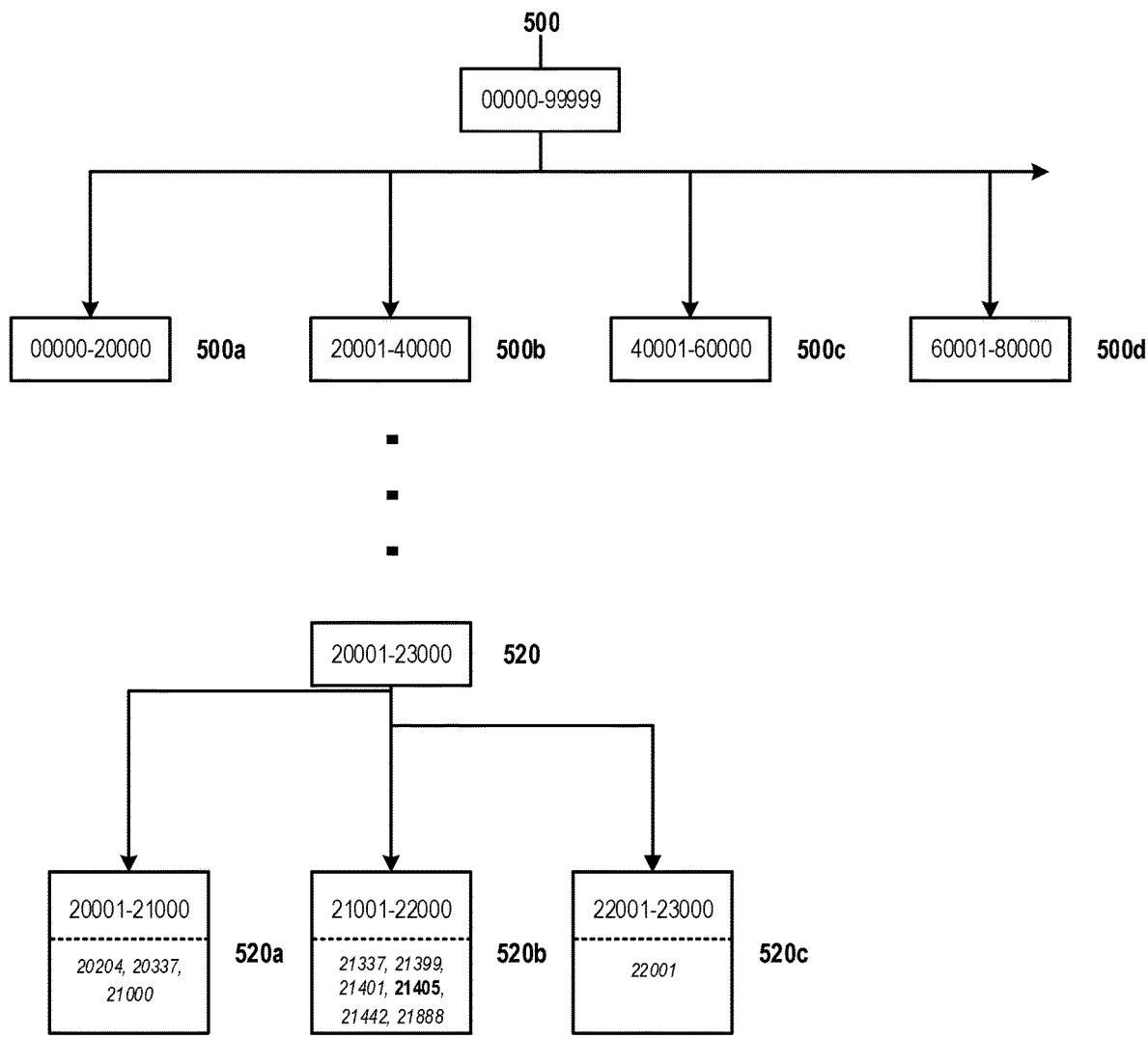
FIG. 5 shows details of a database index, as is known in the art.

FIG. 5 shows details of database index 430, as is known in the art. FIG. 5 shows items 500-520b.

As described in FIG. 4, a DBMS 4001 locates data items stored in database tables 440 of a database 4002 by traversing entries of a hierarchical index 430. Leaf nodes of the hierarchical index 430 store index values that each identify a location of a data item stored in a database table 440. DBMS 4001 may locate a particular index value by traversing the index hierarchy 430 from its root node 500 to a leaf node.

The example of FIG. 5 shows details of a simplified hierarchical index 430 that stores values of an index that points to 5-digit address codes stored in database tables 440. Root node 500 is capable of pointing to any possible value of the address-code field within the range of 00000-99999. Nodes 500a-500d are four of the first-generation child nodes of the root node, each of which identifies a 20,000-value subset of all possible address-code values. The range specified by any of these first-generation nodes 500a-500d is in turn divided among two or more second-generation child nodes.

This hierarchical organization extends through lower tree levels until reaching leaf nodes of the hierarchy, such as leaf nodes 520a-520c. Each non-leaf node contains pointers to that non-leaf node's child nodes. Each leaf node (also referred to in this document as a "leaf page") stores pointers, or other location identifiers, to address-node data items stored in database 4002.

In this example, if DBMS 4001, in response to receiving SQL code that includes an INSERT clause, must add an address-code "21405" to a table 440 of database 4002, DBMS 4001 must then record the location of the newly added address-code data item in a corresponding leaf node of hierarchical index 430.

In FIG. 5, DBMS 4001 would determine which leaf node should be updated by traversing the index hierarchy 430 from root node 500 through first-generation node 500b, then through subsequent generations of child nodes (not shown in FIG. 5) to node 520, and finally to leaf node 520b, which stores locations of stored address-code data items that fall within the range of "21001" through "22000. A pointer to the newly added data item is then added to leaf node 520b." If DBMS 4001 wishes to access the newly added data item at a later time, DBMS 4001 would perform a similar traversal to leaf page 520b, from which DBMS 4001 would retrieve the location of the newly added data item within data tables 440.

Figure 6:
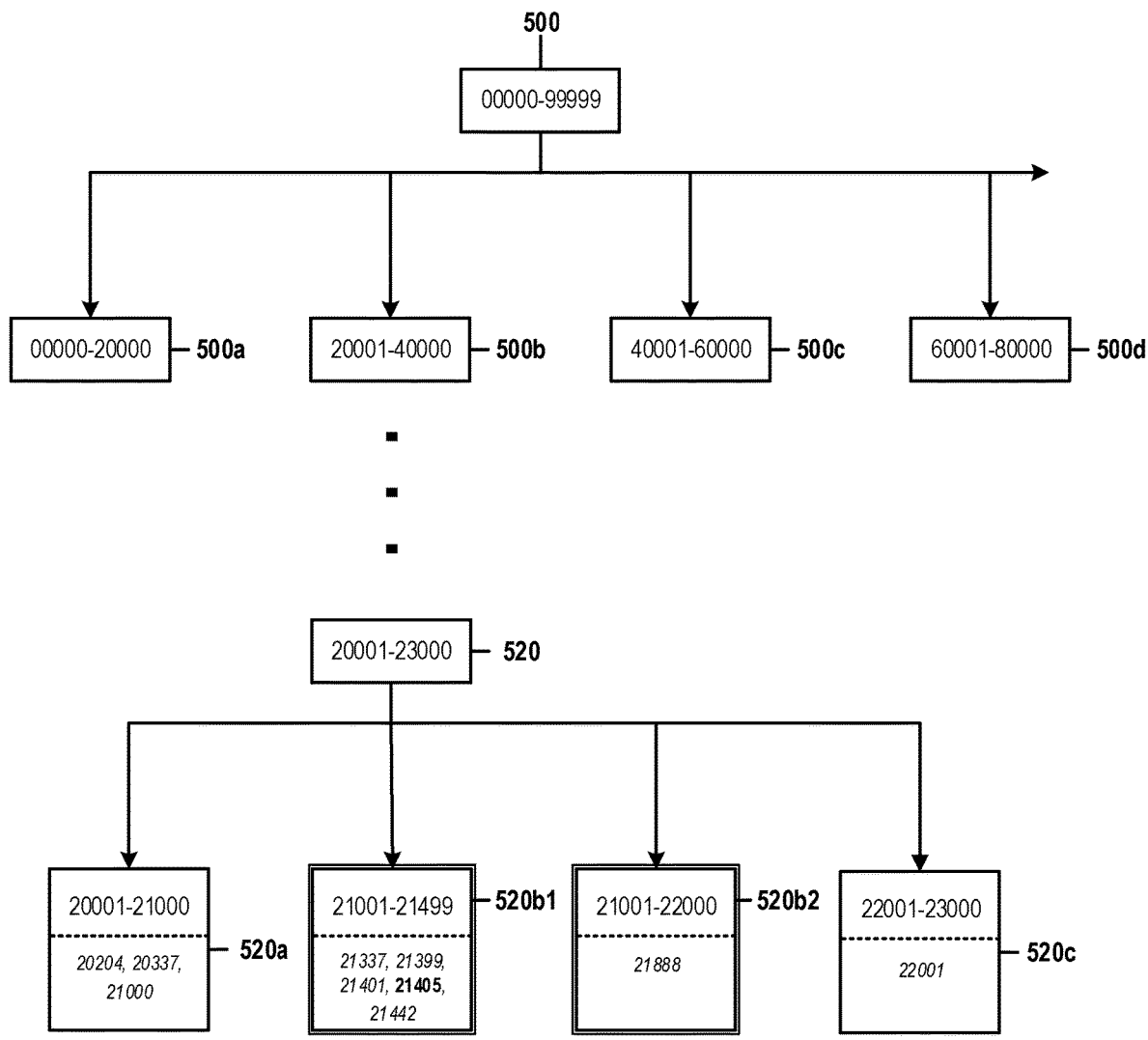
FIG. 6 shows a known method of splitting a database index.

FIG. 6 illustrates a known method of splitting a database index. FIG. 6 shows items 520-620c, which are similar in form and function to identically numbered items in FIG. 5, and items 520b1 and 520b2

In this example, leaf nodes 520a-520c are fixed in size such that no single leaf node 520a-520c can store more than five pointers. There is thus no room for DBMS 4001 to insert a pointer to new data item 21405 into node 520b. When this happens, DBMS 4001 must split the overflowing node 520b into two new leaf pages 520b1 and 520b2. In some cases, a DBMS 4001 would perform a functionally equivalent splitting operation in which, rather than replacing leaf node 520b with new leaf nodes 520b1 and 520b2, the values stored in leaf node 520b are instead divided between leaf node 520b and a single new leaf node 520b1.

In either case, known DBMSs 4001 generally perform this split by simply dividing the range of values referenced by leaf node 520b evenly between the two resulting leaf nodes (either 520b and 520b1 or 520b1 and 520b2). Although known DBMSs 4001 perform most index operations asynchronously—that is, concurrently with other database operations—index splitting must be performed synchronously, thus locking portions of the index and, in some embodiments, portions of database log 420 until the splitting operation is complete. This constraint occurs because splitting an index requires full completion of multiple operations, and any attempt to update a database table 440 or index 430 when all of those operations are not fully completed can result in errors.

In the example of FIG. 6, leaf pages 520b1 and 520b2 must be created, the contents of original leaf node 520b must be copied to leaf pages 520b1 and 520b2, original leaf node 520b must be deleted, and pointers in node 520 must be adjusted to point to new leaf pages 520b1 and 520b2. If this portion of the index is not locked, it would be possible for an index operation to be attempted before all components of the splitting operation are completed, resulting in an error. For this reason, reducing the number and frequency of index-splitting operations can improve performance of a DBMS 4001.

Known methods of index splitting, however, can be inefficient, resulting in unnecessary, but avoidable, splitting operations. In the example of FIG. 6, splitting node 520b by simply allocating half of the range of values to each of the new subnode leaf pages 520b1 and 520b2 results in five of the six 520b values being allocated to 520b1, but only one of the 520b values being allocated to 520b2. Node 520b1 will thus need to be split again the next time an address-code value within the range of 21001-21499 is added to a database table 440. Node 520b2, however, has room for four more entries.

This problem is especially troublesome when DBMS 4001 is asked to perform a massive sequential INSERT or other type of operation that entails adding a large number of sequential values to database 4001. For example, if implemented as a financial-management application, DBMS 4001 may receive an instruction to record the day's trades for a particular municipal fund—which may number in the thousands—into database 4002. If these data items are indexed by the stock symbol or by the date and time of each trade, the newly inserted items may be indexed by a sequence of consecutive index values. If all of the newly added index values are stored on the same leaf page, it is likely that index-management module 410 of DBMS 4001 will have to split that page in order to accommodate the mass insertion.

Such mass inserts may be common in a DBMS system and each occurrence results in a brief locking of at least some nodes of the index hierarchy 430. In applications where large sequential index insertions occur frequently, legacy methods of splitting index leaf pages can significantly reduce the performance of a DBMS 4001.

Figure 7:
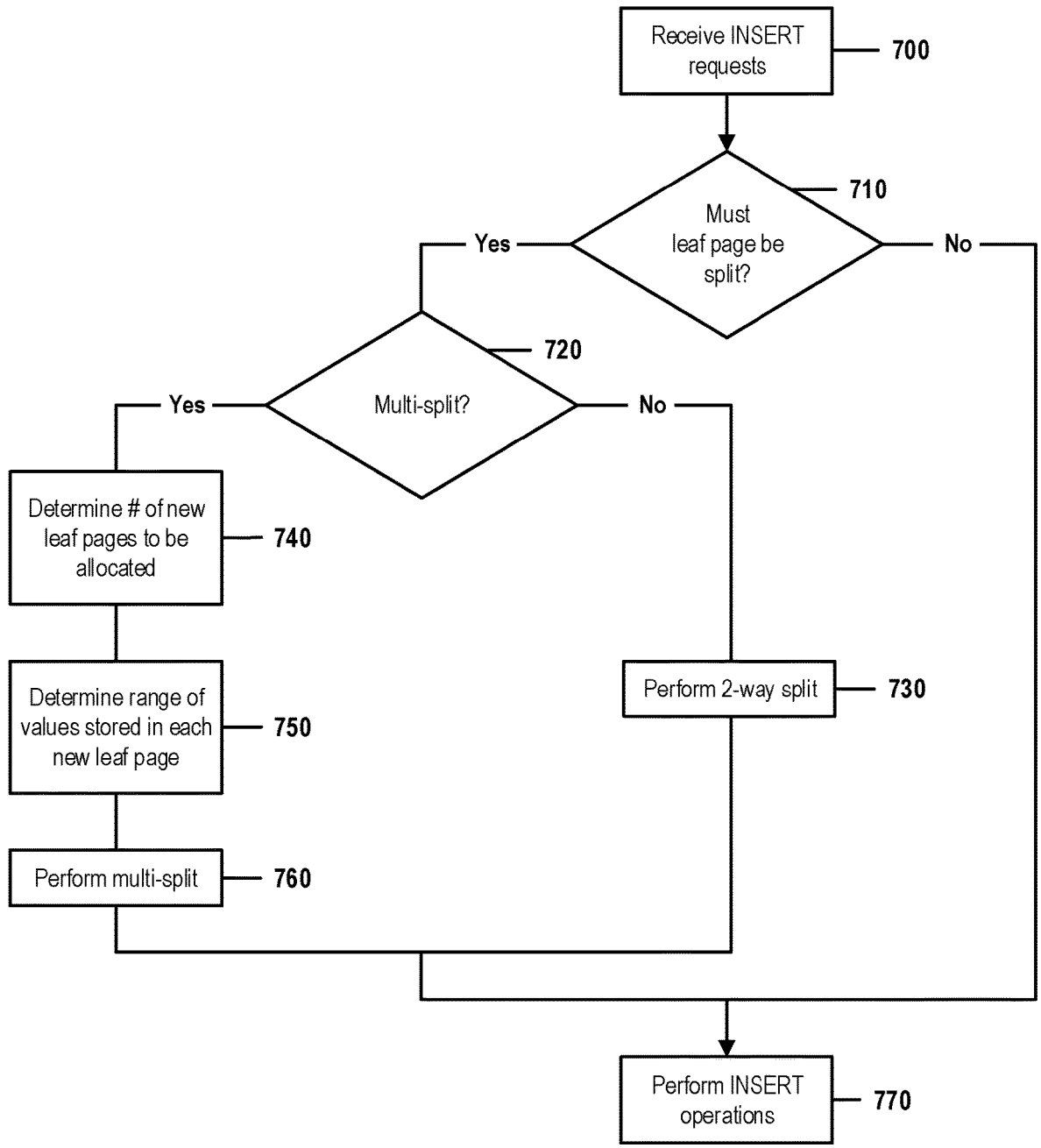
FIG. 7 is a flow chart that illustrates steps of a method for multi-page splitting of a database index in accordance with embodiments of the present invention.

FIG. 7 is a flow chart that illustrates steps of a method for multi-page splitting of a database index in accordance with embodiments of the present invention. FIG. 7 contains steps 700-770.

In step 700, an index-management function or module 410 of a DBMS 4001 (henceforth "system 410") receives notification that DBMS 4001 has received a database-access request that requires the addition of one or more entries to a leaf page 520a-520c of the DBMS 4001's hierarchical index data structure 430.

This notification may be received by any means known in the art. For example, a component 400 of DBMS 4001 may, upon parsing an incoming SQL statement or an incoming inter-application message received from another application, determine that the incoming information contains an SQL INSERT predicate or other requirement that DBMS 4001 add a new data value into a table 440 of the database 4002 managed by DBMS 4001. Such an addition of a new data item would thus require the index-maintenance module 410 to add a pointer to the newly added value to an appropriate leaf node 520a-520c of hierarchical index 430.

This notification comprises information that allows index-maintenance module 410 to identify the value of the newly added data item. This information also allows index-maintenance module 410 ("system 410") to determine which index or key is used by DBMS 4001 to record locations of values added to the table 440 and column containing the newly added data item.

If the notification comprises the addition of more than one data item or the addition of pointers to more than one index or leaf node of index hierarchy 430, steps 710-760 are repeated for each such addition.

In step 710, system 410 uses information received in step 700 to identify a leaf page of the appropriate index of index hierarchy 430. This leaf page is associated with a subset of the range of values that may be stored in the database column to which the newly added data item has been added. Because the value of the newly added data item falls within the range subset, a pointer to the newly added item would normally be added to this identified leaf page.

For example, in FIG. 5, if the newly added data item is an address code of value 20997, system 410 would in step 710 identify leaf page 520a as the correct page in which to insert a pointer to the location of newly added data value 20997. Leaf page 520a is selected in this case because leaf page 520a stores pointers to address-code data items comprising values falling within the range 20001-21000.

System 410 further determines in this step whether the identified leaf page must be split in order to accommodate a pointer to the newly added data item. This determination may be made by any means known in the art, such as by determining that adding a pointer to the newly added data item would result in the number of pointers stored in the identified leaf page to exceed a threshold value or percent of the page's total capacity or size.

If the system 410 determines in step 710 that the identified leaf page must be split in order to accommodate the pointer to the newly added data item, then the method of FIG. 7 continues with steps 720-730. If the system 410 determines in step 710 that the identified leaf page does not need to be split, the method of FIG. 7 jumps to step 770.

Figure 8:
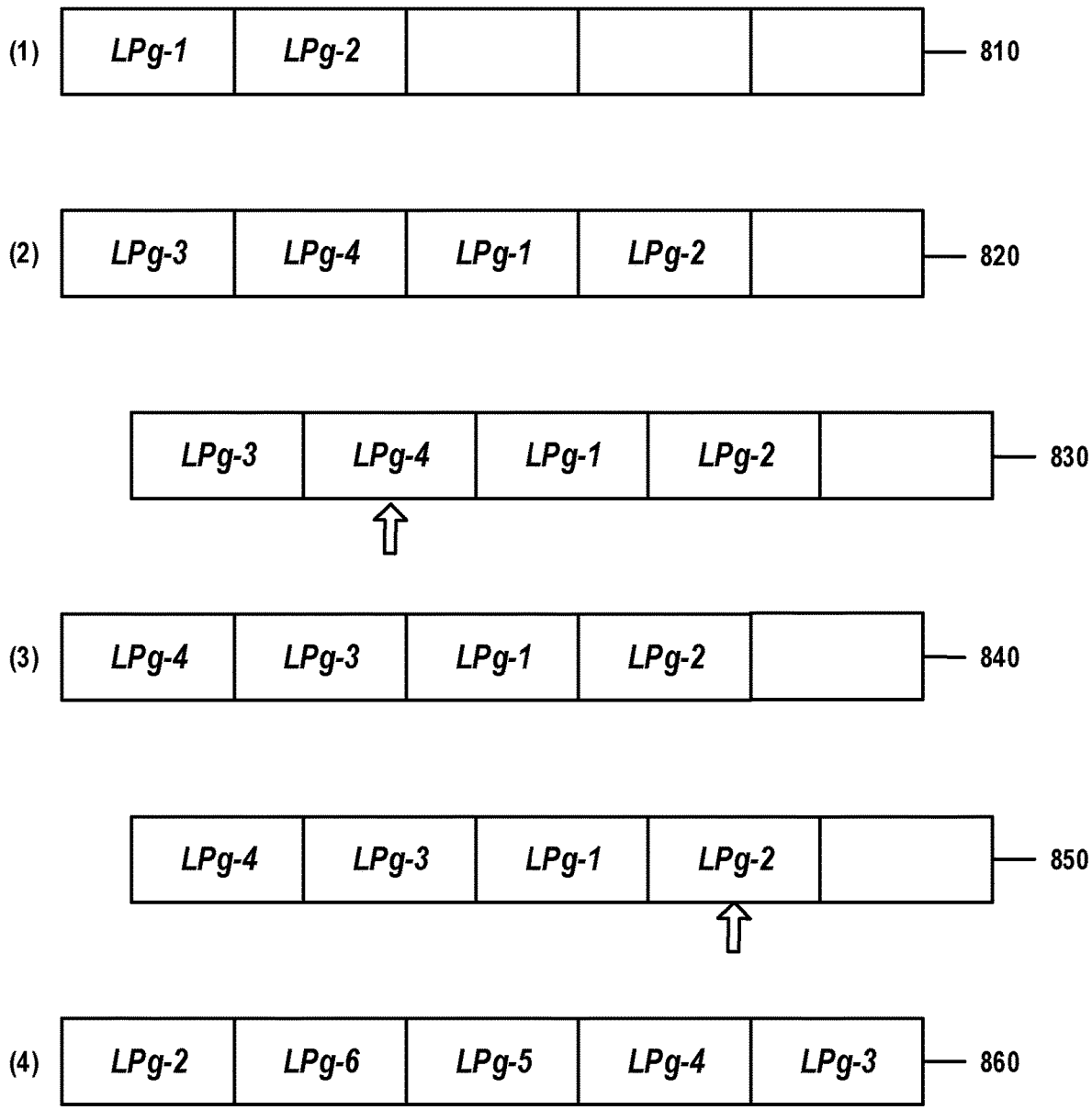
FIG. 8 shows exemplary states of a queue data structure that can be used by embodiments of the present invention to determine whether an index leaf page should be multi-split.

In step 720, system 410 determines whether the identified leaf page should be split into two leaf pages in a conventional manner. This determination may be made by any means known in the art. FIG. 8 illustrates one method for making this determination as a function of the identified leaf page's degree of "hotness" (that is, the relative frequency with which pointers are added to the identified leaf page or with which the leaf page is otherwise updated). In such cases, a leaf page to which new values are added at a rate that exceeds a predetermined threshold value result in a determination to perform a "multi-split," in which the identified leaf page is split into more than two pages.

If system 410 determines in step 720 that the identified leaf page should be split into two leaf pages in a conventional manner, system 410 performs a conventional two-way split in step 730. An example of such a split is shown in FIG. 6. In certain embodiments of the present invention, however, the range of values associated with the identified page may not be divided evenly between two equal-sized leaf pages.

For example, leaf page 520*b* in the example of FIGS. 5 and 6, stores pointers to data-element values that range from 21001 through 22000. Evenly dividing this range into two sub-ranges 21001-21499 and 21001-22000 produces a result in which five of the six pointers originally stored in leaf page 520*b* are stored in leaf page 520*b*1, but only one of those six pointers is stored in leaf page 520*b*2. Certain embodiments may address this imbalance by performing a version of step 750 prior to performing step 730. This additional step may use criteria similar to that of step 750 to determine a more efficient way to allocate pointers originally stored in leaf page 520*b* between leaf page 520*b*1 and 520*b*2.

If system 410 determines in step 720 that pointers stored in the identified leaf page should be divided among more than two leaf pages, system 410 continues with steps 740-760 before performing step 770.

In step 740, system 410 determines the total number of leaf pages into which the identified leaf page should be split. This step may be performed by any means known in the art, but FIG. 9 describes one such method of determination that is used in examples and embodiments described in this document.

In step 750, system 410 determines how the range of values associated with the identified leaf page are divided among the new leaf pages created by the multi-split. This step may be performed by any means known in the art, but FIG. 10 describes one such method of determination that is used in examples and embodiments described in this document.

In step 760, system 410 performs the multi-split by means of a procedure similar to that described in FIG. 6 for splitting leaf page 520*b* into leaf pages 520*b*1 and 520*b*2. In step 760, however, system 410 splits the identified leaf page into three or more leaf pages, the number of which was determined in step 740, and divides the range of index values associated with the identified leaf page among the newly split leaf pages according to divisions identified in step 750.

In step 770, once index-management component 410 of DBMS 4001 has completed all splitting operations, if any, index-management component 410 and any other required components 400 of DBMS 4001 complete any remaining tasks required to complete the requested INSERT operations. These tasks may, for example, include updating database tables 440, updating other elements of the hierarchical index 430, creating entries in database log 420, or engaging in communications with the user, application, or system that originally submitted data-access requests that resulted in the notification of step 700.

FIG. 8 shows exemplary states of a queue data structure that can be used by embodiments of the present invention to determine, in step 720 of FIG. 7, whether an index leaf page should be multi-split. FIG. 8 shows items 810-860.

When an index leaf page is found to contain more entries than desired, known DBMSs split the leaf page into two and only two new pages, dividing the entries in the original leaf page between the two new pages. Embodiments of the present invention, however, may perform a multi-split operation, which divides entries contained in an existing leaf page, such as items 520*a*-520*c* of FIG. 5, among three or more newly created leaf pages.

Because a multi-split requires more steps and consumes more resources than does a conventional two-way split, embodiments perform a multi-split only when determining that a leaf page, such as page 520*b* of FIG. 5: 1) contains a greater number of entries than is desirable; and 2) is a "hot" page into which new entries are inserted with great frequency.

Item 810 is a simplified representation of a fixed-length queue (or stack) data structure that is used by DBMS index-management module 410 to determine if a leaf page is sufficiently "hot" to warrant a multi-split. In this example, each entry of queue 810 identifies a recently split leaf page of a particular index, with the most recently split pages entering from the left in a LIFO fashion. For example, queue 810 lists the most recent leaf page to be split, page 1 of index LPg (denoted as "LPg-1") in the leftmost cell of queue 810 and the second-to-the-last split page, "LPg-2," is listed in the second leftmost cell.

The decision whether to perform a conventional two-way split or a multi-split is based on the state of queue 810 at the time when the split request is received. This procedure follows a set of rules and constraints:

entries in queue 810 are arranged left-to-right as a function of how recently each leaf page represented by an entry was last split; more-recently split pages are listed to the left of less-recently split pages;

each newly split page is added to the queue 810 as a leftmost entry; existing entries are then shifted one cell to the right;

when a page that is already listed in the queue 810 is split, that page's entry is shifted to the leftmost position of the queue 810, representing that the newly split page is now the most recently split page; and when the number of entries becomes too large to fit in the queue 810, the least-used entry in the queue 810 is deleted to make room for a new entry.

When the index-management module 410 determines in step 710 of FIG. 7 that a leaf page should be split, the module 410 first determines whether the page is already listed in the queue. If the page is not listed in the queue, the module 410 services the split request with a two-way split and adds the newly split page to the leftmost cell of the queue 810. If the page is already listed in the queue, the module 410 services the split request with a multi-split.

This procedure is illustrated by items 820-850, which represent a chronologically ordered sequence of states through which queue 810 passes when receiving two split requests.

Item 820 shows the state of queue 810 after index-management module 410 first splits page LPg-4 and then splits page LPg-3. Because neither page LPg-3 nor page LPg-4 was already listed in queue 810, both split requests were serviced as two-way splits. Entries for page LPg-4 and then LPg-3 were added to queue 810 from the left and the two existing entries, as is known in the art, are shifted to the right to make room for the two more-recent entries. One unused cell remains in queue 820.

Item 830 shows an arrow that represents the receipt of a new split request, received while the queue is in the state of item 820, and directed toward page LPg-4. Because an entry for page LPg-4 already exists in queue 820 (and 830), index-management module 410 will service this request by performing a multi-split operation. The presence of the existing entry for LPg-4 indicates that LPg-4 is likely to be a "hot" page that receives more frequent split requests. Although the term "more frequent" might be construed to be a relative, potentially ambiguous, term, the queueing mechanism of FIG. 8 allows implementers to identify relative hotness of a leaf page quantitatively and deterministically.

Item 840 shows the state of queue 810 after LPg-4 has been multi-split. The entry for LPg-4 has been moved to the left most position, signifying that LPg-4 is the leaf page that has most recently been split. The other three entries of queue 820 have been shifted to the right, accordingly, signifying that the three leaf pages that correspond to those entries have been less-recently split than page LPg-4.

Item 850 signifies the receipt of a sequence of three split requests, first for leaf page LPg-5, then for leaf page LPg-6, and finally for LPg-2. Because leaf pages LPg-5 and LPg-6 are not referenced by an existing entry of queue 840, index-management module services those requests by splitting each of the two pages into two new leaf pages. But because leaf page LPg-2 is already listed by an existing entry of queue 840, index-management module services the request to split page LPg-2 with a multi-split operation.

Item 860 shows the queue state after servicing the two split requests for pages LPg-5, LPg-6, and LPg-2. Three new entries have been added to the left side of queue 860, which represent, in chronological order, the three most recent splits performed upon queue 840 or 850. An entry for leaf page LPg-2 had already existed in queue 840 and 850, but two new entries had to be added to represent the recent splitting of pages LPg-5 and LPg-6. The queue state of item 850, however, had left room for only one new entry. The least-recently used entry, for page LPg-1, was therefore shifted out of queue 850 to make room for the two newly added entries.

The present invention is flexible enough to accommodate embodiments that incorporate such fixed-size queues of any size. The number of entries in such queues may be selected arbitrarily by an implementer or may be selected empirically, by measuring the relative performance of DBMS 4001 with different queue sizes.

Machine-learning technology may also be used to dynamically select queue sizes. In such embodiments, a cognitive or artificially intelligent component of DBMS 4001 or index-management module 410 will monitor characteristics of DBMS 4001 performance and intelligently adjust queue size, either periodically or continuously, in order to ensure that the index-splitting mechanism produces optimal results. Such machine-learning technology may also be used in certain embodiments to manage other functions performed by index-management module 410, such as the determination of the number of pages into multi-split a leaf page (as in FIG. 7, step 740 and in FIG. 8) or the optimal range of values to assign to each newly added page during a multi-split operation (as in FIG. 7, step 750).

The left-to-right prioritization feature described in the example of FIG. 8 should not be construed to limit embodiments of the present invention to queues in which more-recently split pages are given queue positions to the left of less-recently split pages. In other embodiments, the queues of FIG. 8 could be organized in an opposite manner, where cells that represent more-recently split pages are given queue positions to the right of less-recently split pages. These two orientations are merely mirror images of each other that are based on an arbitrary implementation decision, and produce functionally equivalent results. Similar considerations may be applied to the more complex queuing mechanism described in FIG. 9, where subqueues may be ordered either right-to-left or left-to-right. In either case, regardless of which option is chosen by an implementer, so long as the embodiment employs either right-to-left or left-to-right organization, functionally equivalent results will be produced so long as the embodiment uses either organization method consistently.

Figure 9:
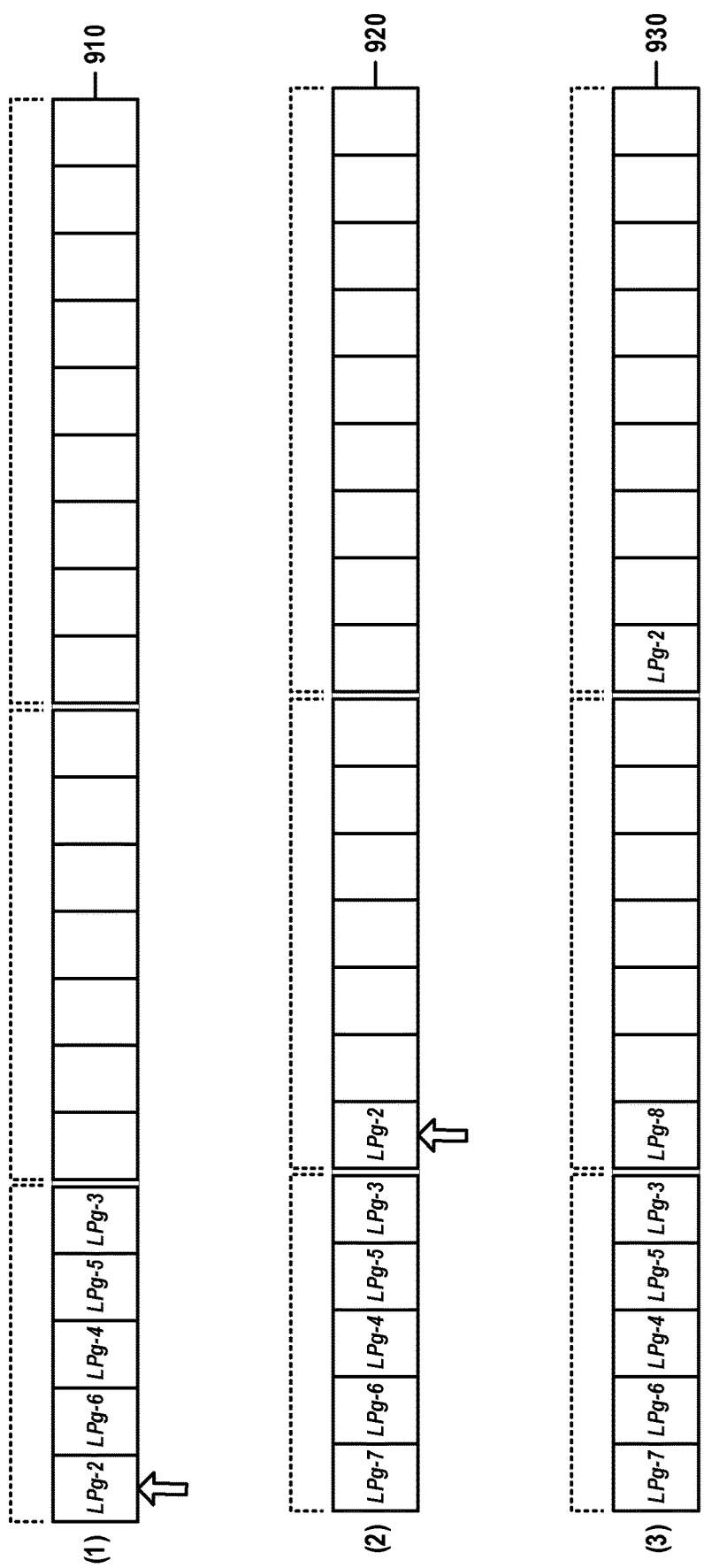
FIG. 9 shows an elaborated version of the queue FIG. 8, which may be used by embodiments of the present invention to determine, in step 740 of FIG. 7, the number of leaf pages to be allocated when performing a multi-split operation.

FIG. 9 shows an elaborated version of the queue FIG. 8, which may be used by embodiments of the present invention to determine, in step 740 of FIG. 7, the number of leaf pages to be allocated when performing a multi-split operation. FIG. 9 shows items 910-930.

In certain embodiments, the queues 810-860 of FIG. 8 may be implemented as a more complex queue-like data structure that comprises two or more subqueues. Each of these subqueues operates in a manner similar to that of the single queue data structure shown in FIG. 8. That is, each of the subqueues contains entries that represent recently split leaf pages and follows rules similar to those enumerated in FIG. 8.

The subqueues are sorted in order of "priority," where leaf pages referenced by cells in a higher-priority subqueue will be split into a greater number of new leaf pages. For example, queue 910 contains three subqueues. In this example, the leftmost subqueue, which contains five entries, has a lower priority than the 7-entry center subqueue, and neither has a priority as high as the 9-entry rightmost subqueue.

Here, when a request is received to split a page listed in the leftmost subqueue, index-management module 410 services that request with a multi-split that splits the listed page into three new leaf pages. Similarly, a request to split a page listed in the center subqueue is serviced with a multi-split that splits the listed page into four new pages, and a request to split a page listed in the highest-priority rightmost subqueue is serviced with a multi-split that splits the listed page into five new pages. As described in FIG. 9, a request to split a page that is not listed in any subqueue of queue 910 is serviced with a conventional two-way split.

As in FIG. 9, the number of entries available in any subqueue, the total number of subqueues, and the number of split pages associated with each subqueue may be chosen arbitrarily, as a function of a trial-and-error process, or by a cognitive application, such as through machine-learning technology. Just as characteristics of the FIG. 8 queues may be tailored for particular indexes, characteristics of the complex queue and subqueues of item 910 may be independently tailored for different indexes.

When a split request is received for a leaf page listed in a subqueue, that leaf-page's entry is promoted to the subqueue that has the next-highest priority. As in FIG. 8, when a subqueue does not have room for a new entry, the new entry will replace that subqueue's entry for the least-recently split page referenced by any existing entry of the subqueue. The new entry is then shifted to the leftmost (most-recently split) position of the subqueue and other entries of the subqueue are shifted to the right.

FIG. 9 illustrates this procedure with the chronologically ordered states 910-930 of an exemplary queue. In item 910, all five cells of the leftmost, lowest-priority, subqueue are filled. The leftmost cell of this subqueue references leaf page LPg-2, which is currently the most-recently split leaf page. The center, middle-priority subqueue and rightmost, highest-priority, subqueue are both empty.

The vertical arrow shown in queue 910 indicates receipt of a request to split leaf page LPg-2. In addition, index-management module 410 also receives a request to split leaf page LPg-7, which is not already referenced by the queue of item 910. Because page LPg-2 is already listed in the lowest-priority subqueue, index-management module 410 performs the following steps in order to produce the queue state of item 920:

i) leaf page LPg-2 is split into three pages because the existing entry for page LPg-2 already exists in the lowest-priority subqueue;

ii) the entry for LPg-2 is promoted to the next-highest priority subqueue, opening up one available cell in the lowest-priority subqueue;

iii) leaf page LPg-7 is split into two pages because no entry for page LPg-7 already exists in any subqueue;

iv) an entry is added to the leftmost ("most recently split") position of the leftmost, lowest-priority, subqueue; and v) the four remaining entries of the lowest-priority subqueue are shifted to the right to indicate that those four entries each reference a leaf page that has not been split as recently as page LPg-7.

The vertical arrow shown in queue 920 indicates receipt of another request to split leaf page LPg-2. Because page LPg-2 is already listed in the middle-priority, center, subqueue, index-management module 410 performs the following steps in order to produce the queue state of item 920:

i) leaf page LPg-2 is split into four pages because the existing entry for page LPg-2 exists in the middle-priority subqueue; and ii) the entry for LPg-2 is promoted to the rightmost, highest priority, subqueue.

The result of these steps is shown in item 930, which represents the state of the multi-queue 910 after processing the second request to split leaf page LPg-2.

When an entry is promoted to a higher-priority subqueue that has no open cells, the rightmost entry of the higher-priority subqueue (associated with the least-recently split leaf page referenced by the higher-priority subqueue) is shifted out of the subqueue. This shifted entry is then demoted to the next-lowest priority subqueue. If that next-lowest priority subqueue has no open slots, the process is repeated, with the least-recently split entry of the next-lowest priority subqueue being demoted to a lower subqueue. As in the example above, when the lowest-priority subqueue must demote a least-recently split entry, that entry is simply deleted.

For example, if the highest priority subqueue of queue 920 had been full when the second request to for page LPg-2 had been received, the middle-priority entry for LPg-2 would be promoted to the leftmost (most recently split) position of the highest-priority subqueue. The rightmost entry of the rightmost subqueue would be shifted to the center subqueue to make room for the promoted LPg-2 entry. In some embodiments, the shifted entry would be shifted to the leftmost position of the center subqueue, because, even though the shifted entry may not have been split as recently as certain other entries of the center subqueue, its prior position in the highest-priority subqueue indicates a split frequency high enough to give it a leftmost position in the center subqueue.

In this manner, when index-management module 410 determines that a multi-split operation may be performed, the position of an entry for the leaf page to be split in the queue of FIG. 9 can determine the number of pages into which the leaf page should be split.

Figure 10:
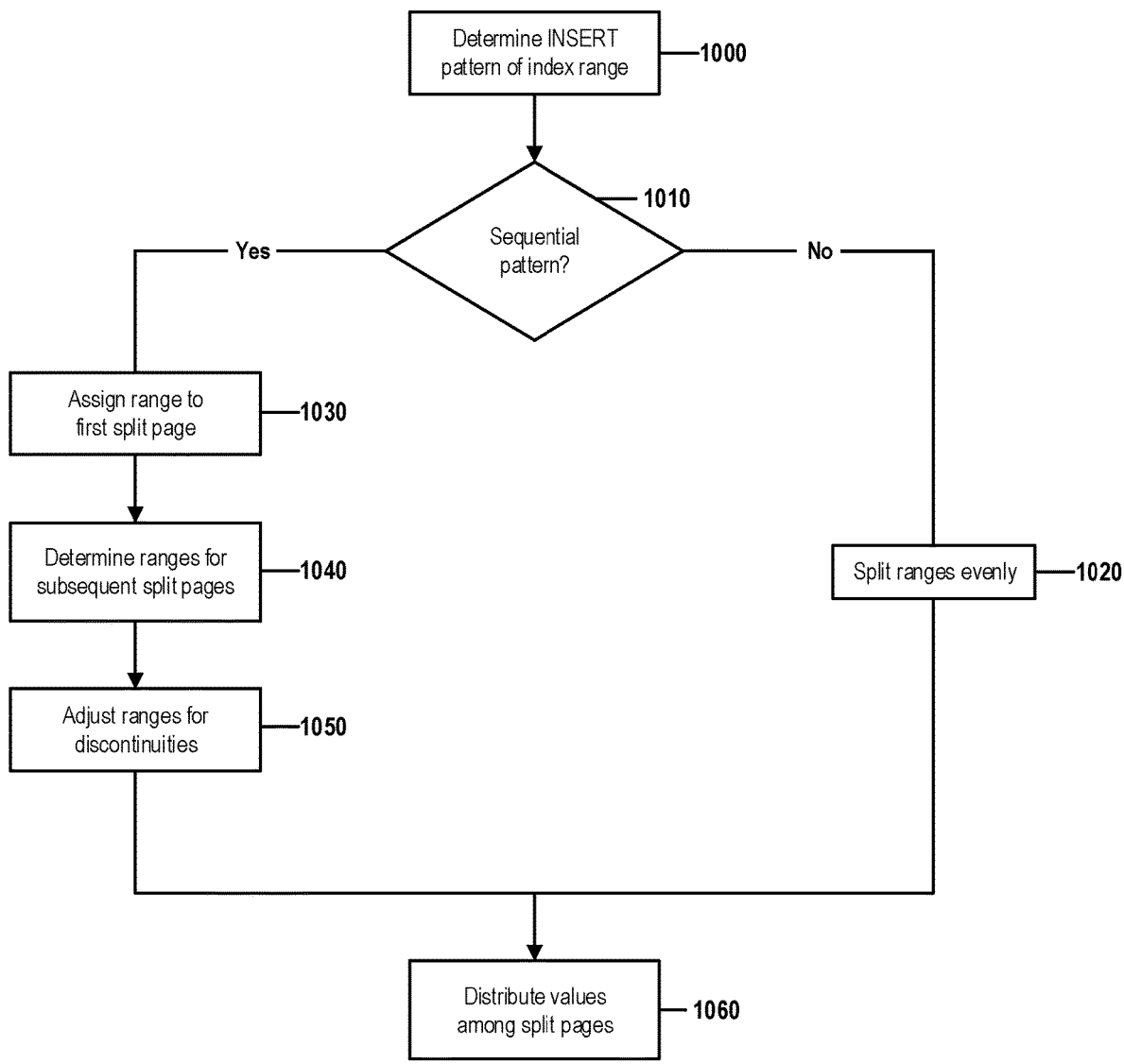
FIG. 10 is a flow chart that illustrates steps of a method for determining ranges of index values to be assigned to each newly added index leaf page after an index multi-split operation.

FIG. 10 is a flow chart that shows details of step 750 of FIG. 7, which determines ranges of index values to be assigned to each newly added index leaf page after an index multi-split operation. FIG. 10 shows steps 1000-1060.

Figure 11A:
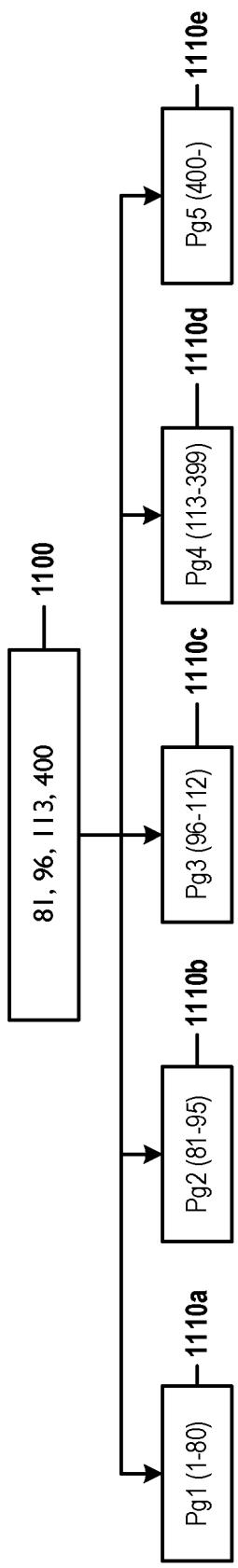
FIGS. 11A and 11B illustrate steps of FIG. 10 with examples of the results produced by performing a multi-split operation upon a hierarchical index.
Figure 11B:
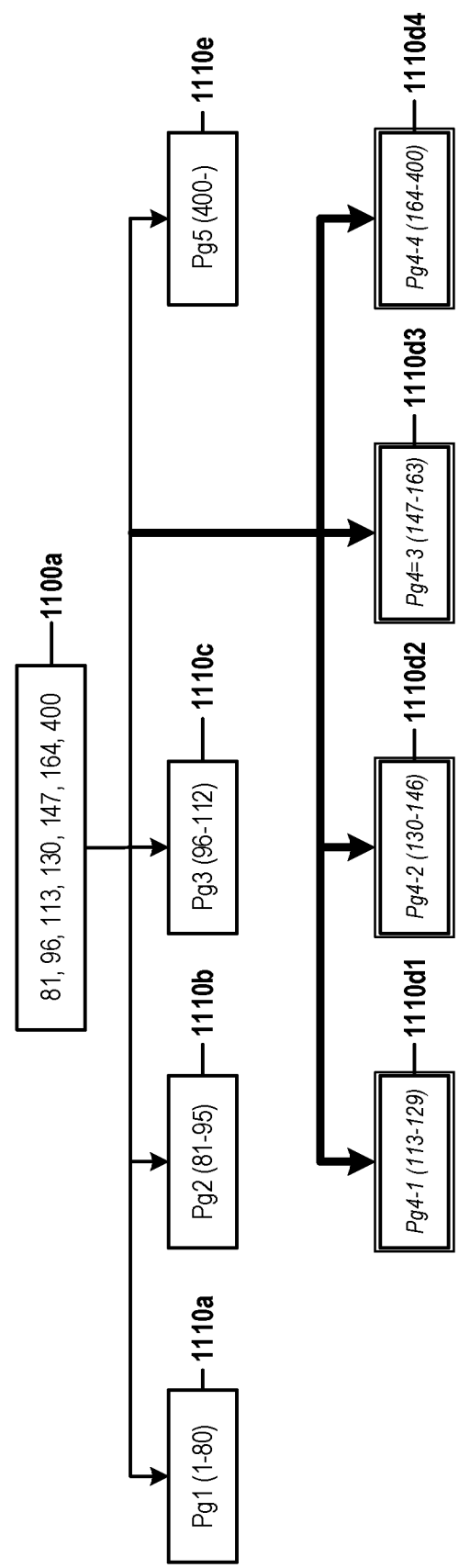

FIGS. 11A and 11B illustrate steps of FIG. 10 with examples of the results produced by performing a multi-split operation upon a hierarchical index.

In step 1000, index-management module 410 ("system 410") determines whether values added to the index to be split are generally added randomly or in a sequential manner. For example, an index, of an ecommerce application, that points to a date field of a transaction table may most often be updated by a daily insertion of a full day's transactions. In such an example, thousands of chronologically sequential records would be entered into the transaction table at a time, resulting in the insertion of thousands of corresponding index values into the date-field index.

This determination may be made by any means known in the art, such as by mining an application's database log 420 for historical records of past transactions, or through methods of artificial intelligence that comprise technologies like cognitive analytics and machine-learning for inferring patterns of past, current, or predicted index-value insertions. For example, in some embodiments, DBMS 4001 may make this determination by reviewing a lookahead cache, query log, or other type of cached transaction records that allow the determination to be made as a function of a current set of transactions that are being processed or are about to be processed by DBMS 4001. In certain embodiments, DBMS 4001 attempts to infer insertion patterns by analyzing historical records of past transactions that resulted in the addition of new index values.

In step 1010, system 410 transfers control to steps 1030-1050 if system 410 determined in step 1000 that the index leaf page to be split is more likely in the future to be subject to sequential insert patterns than to random insert patterns. If system 410 determines that the page to be split is more likely in the future to be subject to random insert patterns, where the value of an index value inserted into the leaf page has little or no influence on the value of the next index value that will be inserted into the leaf page, then system 410 performs step 1020.

In step 1020, system 410 splits the range of values evenly among the newly created pages. For example, if the original leaf page contains pointers to data items that contain values ranging from "0001" to 9999," a determination that the original leaf page is subject to a random insertion pattern would result in the original leaf page's range being split evenly among the newly created pages created by a multi-split operation. If the multi-split operation splits the original page into three pages, those three pages would be associated, respectively, with ranges "0001" to "3333," "3334" to "6666," and "6667" to "9999."

In step 1030, system 410 assigns a range to the first leaf page of the pages newly added by the multi-split operation. The lower bound of this range must be identical to the lower bound of the range of the original leaf page in order to maintain continuity with the preceding index leaf page.

This procedure is illustrated in FIGS. 11A and 11B, which show states of a portion of a hierarchical database index 430 before and after the performance of a multi-split operation.

In FIG. 11A, a parent node 1100 of a hierarchical index data structure 430 has five child nodes 1110a-1110e, each of which is a leaf page. Parent node 1100 specifies, for each leaf page 1110a-1110e, a parent key that defines the exclusive upper limit of values that can be referenced by each respective leaf page 1110a-1110e.

These parent keys have values 81, 96, 113, and 400 and the index values can assume the value of any natural number (that is, any whole number greater than zero). This means that the first leaf page ("Pg1") 1110a, which has a parent key value of 81, contains pointers to any corresponding indexed data elements stored in database 4002 that have values in the range of 1-80. The next leaf page in the index, "Pg2" 1110b, has a parent key value of 96, associating the Pg2 leaf page 1110b with the stored-value range 81-95. Similarly, leaf page "Pg3" 1110c stores pointers to values in the range 96-112, and leaf page "Pg4" 1110d stores pointers to stored database values in the range 113-399. The final leaf page "Pg5" 1110e for this index has no parent-key upper limit and thus stores pointers to stored values greater than or equal to 400.

FIG. 11B shows the index data structure 430 after Pg4 1110d has been split into four new leaf pages: "Pg4-1" 1110d1 through "Pg4-4" 1110d4. As will be described below, parent node 1100a, in FIG. 11B, is a revised version of node 1100 that has been updated after completion of the split operation. The updated node 1100a contains newly added parent key values for the newly added leaf pages 1110d1-1110d4. Other items in FIG. 11B are identical in form and function to similarly numbered items of FIG. 11A.

In the example of FIG. 11B the first newly added leaf page, "Pg4-1" 1110d1, is associated with a range of values ranging from the prior lower boundary of Pg4 1110d through a new upper boundary. In some embodiments, this new upper boundary may be selected by any means known in the art. For example, an implementer might arbitrarily select this new upper boundary such that the range of post-split leaf page Pg4-1 1110d1 spans 90% of the values of pre-split leaf page Pg4 1110d. In other embodiments, an implementer might arbitrarily select this new upper boundary such that post-split leaf page 1110d1 contains 90% of the entries that had been stored in pre-split leaf page Pg4 1110d. The example of FIG. 11B follows this latter convention.

In this example, Pg4-1 1110d1 is associated with a range of values 113-129 because 90% of the values stored in pre-split leaf page Pg4 1110d fell within the range of 113-129. The remaining 10% of the values originally contained in pre-split leaf page Pg4 1110d consisted of four values: 130, 150, 170, and 172. As explained below, these four values will be distributed among the other three pages 1110d2-1110d4 created by the multi-split operation.

In other embodiments, a different percent value may be selected by an implementer based upon the implementer's expert knowledge or upon empirical or archived records that relate the index, insertion patterns, statistical distributions of data stored in the database 4002, or other characteristics of the DBMS 4001 and database 4001. As with other determinations made by system 410 in the method of FIG. 10, this determination may be made with the assistance of artificially intelligent or cognitive technology or as a function of a machine-learning or data-mining component.

In step 1040, system 410 determines ranges for the other leaf pages generated by the multi-split. This step entails identifying a "delta" value that specifies the number of values included in each range. The resulting ranges are configured to ensure that the newly added pages continuously cover, without overlap, the entire range that had been associated with the pre-split leaf page.

In embodiments and examples described in this document, a delta value is defined as a difference between the parent key of the first newly added leaf page and the parent key of the leaf page that precedes the first newly added leaf page.

Each subsequent leaf page of the newly added pages is assigned a range that extends the range of the previous leaf page without gap and that contains the number of values specified by the delta value. FIGS. 11A and 11B illustrate this step by assigning ranges to three of the four leaf pages generated by splitting leaf page Pg4 1110d.

In FIG. 11B, system 410d had, by performing step 1030, assigned a range of 113-129 to the first newly added page Pg4-1 1110d1. The parent key of Pg4-1 1110d1 is therefore 130, one value larger than the upper boundary of Pg4-1 1110d1's range of values. As mentioned earlier, the parent key of preceding page Pg3 1110c is 113. The delta value for this index is thus equal to the quantity (130−113)=17.

The ranges of the next two newly added leaf pages Pg4-2 1110d2 and Pg4-3 1110d3, each contain 17 values, as determined by the delta value. Because these ranges are contiguous, each range's lower boundary is one value higher than the previous range's upper value. The lower boundary of the range of the final leaf page Pg4-4 1110d4 is derived in the same way, but the upper boundary of Pg4-4 1110d4 is extended to the value 399 to prevent a gap with the lower boundary value of 400 of the next pre-split page Pg5 1110e.

This yields the results:
the range of Pg4-1 1110d1=(113-129)
the range of Pg4-2 1110d2=(130-146)
the range of Pg4-3 1110d3=(147-163)
the range of Pg4-4 1110d4 32 (164-399)

These four split pages will seamlessly cover the range of values (113-399) associated with pre-split leaf page 1110d.

In step 1050, system 410 adjusts these ranges to account for discontinuities in certain types of values. For example, if the data items pointed to by an index contain string values—that is, variables composed of numerically encoded alphanumeric characters—a character-encoding scheme may omit certain numeric values.

In one example, when string characters are encoded according to the Extended Binary Coded Decimal Interchange Code (EBCDIC) standard, each alphanumeric character is stored by a computer as a set of two hexadecimal digits. However, certain pairs of hexadecimal digits are skipped. Characters "A" through "I" are represented in EBCDIC, respectively, by hex codes C1 through C9. However, characters "J" through "R" are represented in EBCDIC, respectively, by hex codes D1 through D9. Hex codes CA through CF are not used to encode any alphanumeric character.

These gaps can affect the computations used in steps 1030 and 1040 to select ranges of values for newly split leaf index pages if those indexes point to a database column that stores EBCDIC-encoded string variables. Although the range "A" through "J" contains ten alphanumeric characters, it spans 17 numeric hex values, 7 of which are not used to encode an alphanumeric character. In this example, if a page contains a ten-value range of alphanumeric characters ranging from "A" through "J," merely subtracting the numeric hexadecimal equivalent of "A" from the numeric hexadecimal equivalent of "J" would yield an incorrect result suggesting that the range contains 17 alphanumeric-character values.

Embodiments that comprise an index that points to alphanumeric database values must thus be aware of and compensate for such gaps. In such cases, each delta value and leaf page range must be adjusted to account for the discrepancy between the way alphanumeric characters are sequenced and how potentially discontinuous numeric representations of those alphanumeric characters are sequenced. In the preceding example, this would mean, inter alia, decreasing the estimated number of values in any range that includes sequential occurrences of alphanumeric characters "I" and "J."

System 410 makes such adjustments, as needed when indexing string data, in step 1050. These adjustments may, in some embodiments, instead be incorporated into steps 1030 and 1040. Although dependent upon the particular encoding scheme used to by DBMS 4001 and database 4002 to represent alphanumeric characters, the adjustments of step 1050 may generally be implemented by means known in the art, such as by means of table lookups or of simple arithmetic formulae.

In some embodiments, the procedure of steps 1030-1050 may, when system 410 detects a sequential insertion pattern, be adapted to determine ranges of leaf pages produced by otherwise-conventional two-way splits. In other words, the two new leaf pages added by the two-way split would be associated with ranges of values that are determined by procedures analogous to those described in steps 1030-1050.

In step 1060, system 410 performs the final tasks needed to complete the split. Following the example of FIGS. 11A and 11B, a parent key for each newly generated leaf node 1110*d*1-1110*d*4 is added to parent node 1100 to generate revised parent node 1100*a*. Index values that had been part of the lower 90% of values stored in pre-split leaf node Pg4 1110 are copied to the first newly added leaf node 1110*d*1. Values that had been part of the upper 10% of values stored in pre-split leaf node Pg4 1110*d* are distributed among newly created leaf nodes 1110*d*2-1110*d*4, according to the ranges determined for each newly created leaf node 1110*d*2-1110*d*4 in steps 1040 and 1050. In certain embodiments, and as described above, values that had been stored in the pre-split leaf node Pg4 1110 may not be split 10/90 by equivalent numeric value, but in all cases, the values that are distributed to the newly create leaf nodes 1110*d*2-1110*d*4 in step 1060 are those values that were not assigned to the first newly added leaf node 1110*d*1 in step 1040.

In the example of FIGS. 11A-11B, the upper 10% of values stored in pre-split leaf page P4 1110*d* (which may include values about to be inserted in service of the INSERT request of step 700) consisted of four index pointers to, respectively, data values 130, 150, 170, and 172. Given the value ranges assigned above to each of the newly added leaf pages 1110*d*1-1110*d*4 in step 1040, system 410 would, in step 1060:

move no values to Pg4-1 1110*d*1 (range 113-129),
    move value 130 to Pg4-2 1110*d*2 (range 130-146),
    move value 150 to Pg4-3 1110*d*3 (range 147-163), and
    move values 170 and 172 to Pg4-4 1110*d*4 (range 164-399)

Figure 12:
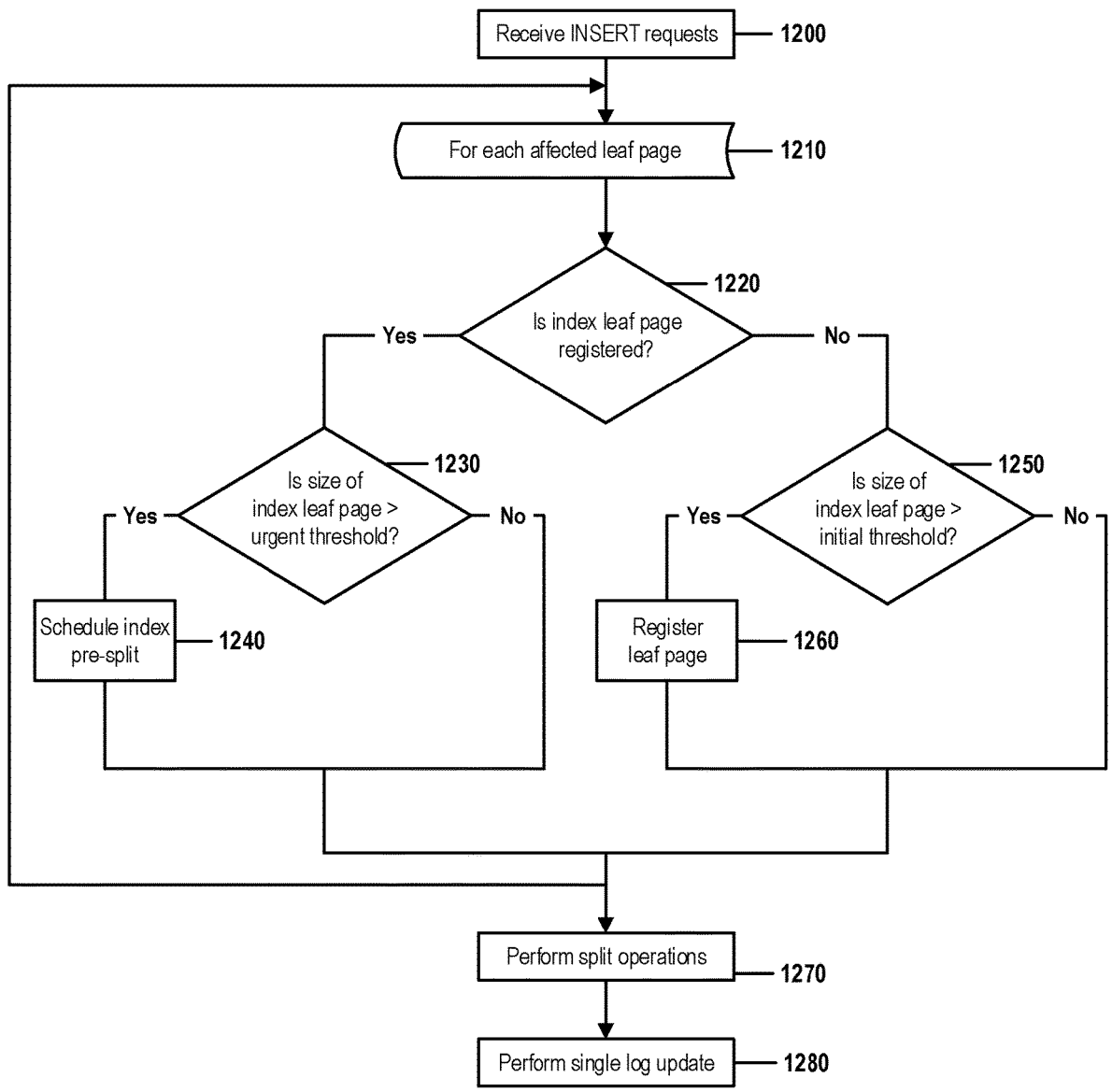
FIG. 12 is a flow chart that illustrates steps of a method for pre-splitting leaf-page nodes of a database index in accordance with embodiments of the present invention.

FIG. 12 is a flow chart that illustrates steps of a method for pre-splitting leaf pages of a database index in accordance with embodiments of the present invention. FIG. 12 contains steps 1200-1280.

The pre-split method of FIG. 12 may be combined with the multi-split method of FIGS. 7 and 10, such that a pre-split splitting operation may be either a two-way split or a multi-split; and a multi-split operation may be performed by systems 410 that also perform pre-splitting operations. In other words, it is possible for an embodiment to implement either multi-splitting functionality, pre-splitting functionality, or both.

In step 1200, an index-management module ("system 410") of DBMS 4001 receives notification that DBMS 4001 has received a database-access request that requires the addition of one or more entries to one or more index leaf pages of an index hierarchy 430 of database 4002, similar to the notification received by system 410 in step 700 of FIG. 7.

Step 1210 begins an iterative procedure of steps 1210-1260, which repeats once for each index leaf page to which entries would be added by servicing the request received in step 1200.

In step 1220, system 410 determines whether the index leaf page being processed by the current iteration of steps 1210-1260 has previously been registered. If so, the method of FIG. 12 continues with steps 1230 and 1240. Otherwise, the method of FIG. 12 instead performs steps 1250 and 1260.

In step 1250, if the index leaf page has not been registered, system 410 determines whether the number of entries stored in the current index leaf page will exceed a predetermined "initial threshold" value after the requested addition of index entries to the current index leaf page. This initial threshold value may be determined by any means known in the art, such as through inferences produced by a cognitive application or machine-learning function that determines when a leaf page contains enough entries to create a certain degree of probability that the page will overflow. In some embodiments, an implementer may choose to initially assign an arbitrary value to the initial threshold, such as a number of entries equal to 60%, 85%, or 90% of the total capacity of the leaf page, and then refine that threshold value over time as a function of how a characteristic of DBMS performance or index-management performance is affected by variations in the initial threshold value.

In step 1260, performed because the system 410 had determined in step 1250 that the number of leaf-page entries will exceed the initial threshold value after completion of the requested operation, system 410 marks the current leaf page as being "registered." The page may be marked by any method preferred by an implementer, such as by adding the registered page's address to a "candidate splitting queue," revising metadata associated with the index, the index hierarchy 430, or the leaf page itself, or by any other known means preferred by an implementer.

Step 1230 is performed if system 410 had determined in step 1220 that the leaf page being processed by the current iteration of the procedure of steps 1210-1260 has already been marked as being "registered." In this step, system 410 determines whether the number of entries in the current leaf page exceeds an "urgent threshold" value. An implementer may make this determination according to the implementer's expert knowledge of DBMS 4001 or as a personal preference of the implementer, based on either the number of entries in the leaf page before completion of the requested operation or the number of entries in the leaf page after completion of the requested operation.

As with the initial threshold, the value of the urgent threshold may be selected by any means known in the art, such as by means of cognitive analytics or machine-learning technology, as a function of empirical measurements, or as a function of an implementer's expert knowledge of DBMS 4002 or of industry conventions or standards. In all cases, however, the urgent threshold should specify a number of values greater than the number of values specified by the initial threshold. For example, if the initial threshold value associated with the current leaf page is equal to 100 entries, an urgent threshold value for that same page could equal 125 entries, but could not equal 90 entries or 100 entries. Similarly, if the initial threshold value associated with the current leaf page is equal to 80% of that page's total capacity, an urgent threshold value for that same page could equal 95%.

In some embodiments, each database index may be associated with a distinct initial threshold value or a distinct urgent threshold value. In other cases, the current leaf page may be associated with two different initial threshold values or two different urgent threshold values, where system 410 selects one of the two initial threshold values or one of the two urgent threshold values as a function of whether it is more likely that the current leaf page is generally subject to random insertions or sequential insertions.

Step 1240 is performed if system 410 in step 1230 determines that the number of entries in the current leaf page exceeds the urgent threshold value for that leaf page. In this case, system 410 in this step schedules the performance of a "pre-split" splitting operation upon the current leaf page. This pre-split may be configured in the same manner as other splitting operations described in the previous figures. That is, depending on a subset of factors described above, the pre-split may be performed as a conventional two-page split or may be a multi-split that splits the current leaf page into three or more newly added pages.

In step 1270, system 410 performs any pre-split operations scheduled by the preceding steps of FIG. 12 during iterations of the procedure of steps 1210-1260. As mentioned above, these pre-split operations may comprise any combination of two-way splits and multi-splits and may be performed on a subset of the index leaf pages capable of being affected by the database operation described in step 1200.

In step 1280, system 410 performs a synchronous log write to database log 420 in order to record changes in the leaf pages that were split and in nodes of the index hierarchy 430 that were parent nodes of the leaf pages that were split. As in a conventional splitting operation, the database log 420 is locked during the actual splitting operation of step 1270 and during the synchronous log write of step 1280. The performance of DBMS 4001 is improved by this mechanism because the method of FIG. 12 requires only one log write for what may be a large number of splitting operations (as in the case of a massive sequential INSERT operation), rather than forcing a synchronous log write for each splitting operation. Furthermore, by scheduling and performing a pre-split before a leaf page reaches a critical state, the method of FIG. 12 allows a DBMS 4001 to schedule a prophylactic pre-split during a period of lower utilization.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A database-management system (DBMS) comprising a processor, a memory coupled to the processor, and a computer-readable hardware storage device coupled to the processor, the storage device containing program code configured to be run by the processor via the memory to implement a method for multi-page splitting of a database index, the method comprising:

receiving, by the DBMS, a notification that one or more entries must be added to a leaf-page node of a hierarchical database index,
where each entry in the leaf-page node is a pointer to a distinct database value stored in a first column of a first table of a database managed by the DBMS, and
where the distinct values fall within a first range of values;

determining, by the DBMS, that the leaf-page node should be multi-split, where multi-splitting a non-empty leaf node of the index comprises replacing the non-empty leaf node with more than two subnodes and distributing the entries in the non-empty leaf node among the more than two subnodes;

dividing the first range of values, by the DBMS, into a set of contiguous, non-overlapping subranges, where each subrange of the set of subranges is assigned to a corresponding subnode of the more than two subnodes;

multi-splitting, by the DBMS, the leaf-page node into the more than two subnodes;

migrating, by the DBMS, each entry in the leaf-page node to a distinct subnode of the more than two subnodes, where each distinct subnode of the more than two subnodes receives entries that point to stored database values that fall within a subrange assigned to the distinct subnode;

replacing in a parent node of the leaf-page node, by the DBMS, a link to the leaf-page node with links that each identify one of the two subnodes; and synchronously writing, by the DBMS, to a transaction log of the DBMS, where the writing records a removal of the leaf-page node from the database index, an addition of the more than two subnodes to the database index, the assignments of each subrange of values to corresponding subnodes, and the replacing of the link stored in the parent node.

2. The DBMS of claim 1, where the determining that the leaf-page node should be multi-split is performed as a function of a frequency with which the leaf-page node has been split in the past.

3. The DBMS of claim 1, where the dividing the first range of values by the DBMS comprises:

setting a lower bound of a first subrange equal to a lower bound of the first range of values;

selecting an upper bound of the first subrange such that the first subrange contains only the lowest 90% of distinct database values pointed to by entries of the leaf-page node;

setting an upper bound of the final subrange equal to an upper bound of the first range of values; and allocating a delta number of values of the leaf-page node to each non-first/non-last subrange, where the delta number is equal to a difference between the upper bound of the first subrange and a value of a parent key of a preceding leaf node that immediately precedes the leaf-page node in the hierarchical database index.

4. The DBMS of claim 1, where a total number of the more than two subnodes is determined as a function of relative frequencies with which leaf pages that contain pointers to values stored in the first column are split.

5. The DBMS of claim 1,
where each distinct value is a numerically encoded representation of an alphanumeric string; and
where determining a number of numeric encoded representations occurring between two alphanumeric values comprises an adjustment to account for discontinuities a sequence of numeric representations specified by a code page of the numeric encoding.

6. The DBMS of claim 1, further comprising:
identifying, by the DBMS, that multiple sequential data values have in the past been simultaneously added to the first column by a single set of INSERT operations; and
specifying, by the DBMS, as a function of the identifying, that the first range of values should not be split evenly among the more than two subranges.

7. The DBMS of claim 1, further comprising:
receiving, by the DBMS, a second notification that a second set of one or more entries must be added to an existing leaf-page node of the hierarchical database index,
identifying, by the DBMS, that a number of entries in the existing leaf-page node will exceed an initial threshold value after the addition of the second set of one or more entries; and
marking, by the DBMS, in response to the identifying, the existing leaf-page node as being registered.

8. The DBMS of claim 7, further comprising:
receiving, by the DBMS, a third notification that a third set of one or more entries must be added to one or more previously accessed leaf nodes of the hierarchical database index,
ascertaining, by the DBMS, that at least one of the one or more previously accessed leaf nodes has been marked as being registered;
further identifying, by the DBMS, that a number of entries in at least one node of the one or more previously accessed leaf nodes will exceed an urgent threshold value after the addition of the third set of one or more entries, where the urgent threshold value is greater than the initial threshold value;
scheduling, by the DBMS, a performance of a multi-split operation upon the at least one nodes; and
synchronously writing, by the DBMS, to a transaction log of the DBMS, upon completion of the multi-split operation upon the at least one nodes, where the writing is a single synchronous log write that records results of performing all the scheduled multi-split operations upon the at least one nodes.

9. A method for multi-page splitting of a database index, the method comprising:
receiving, by a database-management system (DBMS), a notification that one or more entries must be added to a leaf-page node of a hierarchical database index, where each entry in the leaf-page node is a pointer to a distinct database value stored in a first column of a first table of a database managed by the DBMS, and where the distinct values fall within a first range of values;

determining, by the DBMS, that the leaf-page node should be multi-split, where multi-splitting a non-empty leaf node of the index comprises replacing the non-empty leaf node with more than two subnodes and distributing the entries in the non-empty leaf node among the more than two subnodes;

dividing the first range of values, by the DBMS, into a set of contiguous, non-overlapping subranges, where each subrange of the set of subranges is assigned to a corresponding subnode of the more than two subnodes;

multi-splitting, by the DBMS, the leaf-page node into the more than two subnodes;

migrating, by the DBMS, each entry in the leaf-page node to a distinct subnode of the more than two subnodes, where each distinct subnode of the more than two subnodes receives entries that point to stored database values that fall within a subrange assigned to the distinct subnode;

replacing in a parent node of the leaf-page node, by the DBMS, a link to the leaf-page node with links that each identify one of the two subnodes; and synchronously writing, by the DBMS, to a transaction log of the DBMS, where the writing records a removal of the leaf-page node from the database index, an addition of the more than two subnodes to the database index, the assignments of each subrange of values to corresponding subnodes, and the replacing of the link stored in the parent node.

10. The method of claim 9, where the determining that the leaf-page node should be multi-split is performed as a function of a frequency with which the leaf-page node has been split in the past.

11. The method of claim 9, where the dividing the first range of values by the DBMS comprises:
setting a lower bound of a first subrange equal to a lower bound of the first range of values;
selecting an upper bound of the first subrange such that the first subrange contains only the lowest 90% of distinct database values pointed to by entries of the leaf-page node;
setting an upper bound of the final subrange equal to an upper bound of the first range of values; and
allocating a delta number of values of the leaf-page node to each non-first/non-last subrange, where the delta number is equal to a difference between the upper bound of the first subrange and a value of a parent key of a preceding leaf node that immediately precedes the leaf-page node in the hierarchical database index.

12. The method of claim 9, where a total number of the more than two subnodes is determined as a function of relative frequencies with which leaf pages that contain pointers to values stored in the first column are split.

13. The method of claim 9, further comprising providing at least one support service for at least one of creating, integrating, hosting, maintaining, and deploying computer-readable program code in the computer system, wherein the computer-readable program code in combination with the computer system is configured to implement the receiving, the determining, the dividing, the multi-splitting, the migrating, the replacing, and the synchronously writing.

14. A computer program product, comprising a computer-readable hardware storage device having a computer-readable program code stored therein, the program code configured to be executed by a database-management system (DBMS) comprising a processor, a memory coupled to the processor, and a computer-readable hardware storage device coupled to the processor, the storage device containing program code configured to be run by the processor via the memory to implement a method for multi-page splitting of a database index, the method comprising:

receiving, by the DBMS, a notification that one or more entries must be added to a leaf-page node of a hierarchical database index,
    where each entry in the leaf-page node is a pointer to a distinct database value stored in a first column of a first table of a database managed by the DBMS, and
    where the distinct values fall within a first range of values;
  determining, by the DBMS, that the leaf-page node should be multi-split, where multi-splitting a non-empty leaf node of the index comprises replacing the non-empty leaf node with more than two subnodes and distributing the entries in the non-empty leaf node among the more than two subnodes;
  dividing the first range of values, by the DBMS, into a set of contiguous, non-overlapping subranges, where each subrange of the set of subranges is assigned to a corresponding subnode of the more than two subnodes;
  multi-splitting, by the DBMS, the leaf-page node into the more than two subnodes;
  migrating, by the DBMS, each entry in the leaf-page node to a distinct subnode of the more than two subnodes, where each distinct subnode of the more than two subnodes receives entries that point to stored database values that fall within a subrange assigned to the distinct subnode;
  replacing in a parent node of the leaf-page node, by the DBMS, a link to the leaf-page node with links that each identify one of the two subnodes; and
  synchronously writing, by the DBMS, to a transaction log of the DBMS, where the writing records a removal of the leaf-page node from the database index, an addition of the more than two subnodes to the database index, the assignments of each subrange of values to corresponding subnodes, and the replacing of the link stored in the parent node.

15. The computer program product of claim 14, where the determining that the leaf-page node should be multi-split is performed as a function of a frequency with which the leaf-page node has been split in the past.

16. The computer program product of claim 14, where the dividing the first range of values by the DBMS comprises:
  setting a lower bound of a first subrange equal to a lower bound of the first range of values;
  selecting an upper bound of the first subrange such that the first subrange contains only the lowest 90% of distinct database values pointed to by entries of the leaf-page node;
  setting an upper bound of the final subrange equal to an upper bound of the first range of values; and
  allocating a delta number of values of the leaf-page node to each non-first/non-last subrange, where the delta number is equal to a difference between the upper bound of the first subrange and a value of a parent key of a preceding leaf node that immediately precedes the leaf-page node in the hierarchical database index.

17. The computer program product of claim 14, where a total number of the more than two subnodes is determined as a function of relative frequencies with which leaf pages that contain pointers to values stored in the first column are split.

* * * * *